US008955468B2

(12) United States Patent
Duwig et al.

(10) Patent No.: US 8,955,468 B2
(45) Date of Patent: Feb. 17, 2015

(54) METHOD AND SYSTEM FOR OPERATING A COMPRESSION IGNITION ENGINE ON ALCOHOL CONTAINING FUELS

(75) Inventors: Christophe Duwig, Malmö (SE); Jesper Norsk, Humlebaek (DK); Ton V.W. Janssens, Bagsvaerd (DK); Pär L. Gabrielsson, Helsingborg (SE)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 13/638,571

(22) PCT Filed: Mar. 2, 2011

(86) PCT No.: PCT/EP2011/001022
§ 371 (c)(1),
(2), (4) Date: Sep. 28, 2012

(87) PCT Pub. No.: WO2011/120616
PCT Pub. Date: Oct. 6, 2011

(65) Prior Publication Data
US 2013/0032113 A1    Feb. 7, 2013

(30) Foreign Application Priority Data

| Mar. 31, 2010 | (DK) | ................................ | 2010 00273 |
| Jul. 2, 2010 | (DK) | ................................ | 2010 00587 |
| Jul. 5, 2010 | (DK) | ................................ | 2010 00590 |
| Sep. 9, 2010 | (DK) | ................................ | 2010 00801 |

(51) Int. Cl.
*F02B 43/00* (2006.01)
*F02B 51/02* (2006.01)
*C10L 1/02* (2006.01)
*F02M 27/02* (2006.01)

(52) U.S. Cl.
CPC ................. *F02B 51/02* (2013.01); *C10L 1/026* (2013.01); *F02M 27/02* (2013.01); *Y02T 10/126* (2013.01)
USPC ........................... 123/1 A; 123/525; 123/557

(58) Field of Classification Search
CPC .............. F02B 51/02; F02B 3/06; F02B 1/12; F02M 27/02; F01B 75/12
USPC .......................................... 123/1 A, 525, 557
See application file for complete search history.

(56) References Cited

U.S. PATENT DOCUMENTS

| 4,418,653 A | * | 12/1983 | Yoon ................................. | 123/3 |
| 4,422,412 A | * | 12/1983 | Norton ............................. | 123/3 |
| 4,631,266 A | * | 12/1986 | Wold et al. ..................... | 502/324 |
| 4,876,989 A | * | 10/1989 | Karpuk et al. .................... | 123/3 |
| 5,092,303 A | | 3/1992 | Brown | |

(Continued)

FOREIGN PATENT DOCUMENTS

| CN | 1316583 A | 10/2001 |
| CN | 101463782 A | 6/2009 |

(Continued)

*Primary Examiner* — Noah Kamen
*Assistant Examiner* — Long T Tran
(74) *Attorney, Agent, or Firm* — Dickstein Shapiro LLP

(57) ABSTRACT

Method of operating a compression ignition engine on ether containing fuel obtained by on board conversion of an alcohol containing primary fuel and a system for use in the method. The ether containing fuel is prepared by dehydration of liquid alcohol containing fuel in present of a dehydration catalyst arranged in a radial flow reactor within a fuel accumulation chamber in a common rail.

11 Claims, 2 Drawing Sheets

(56) References Cited

U.S. PATENT DOCUMENTS

Figure 1:
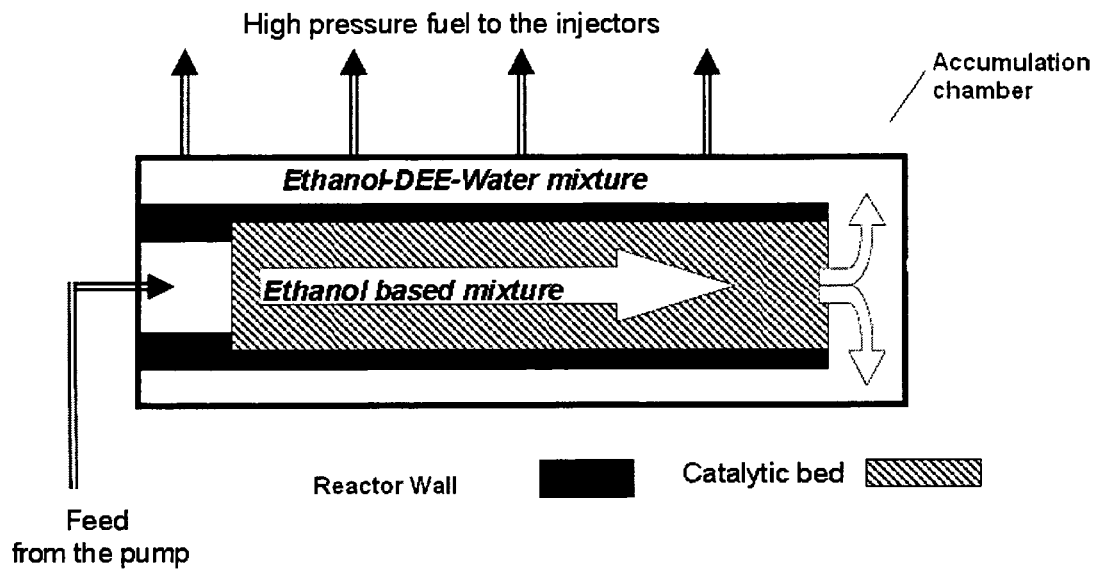

| | | | |
|---|---|---|---|
| 5,097,803 A * | 3/1992 | Galvin | 123/3 |
| 5,119,775 A | 6/1992 | Kokubo et al. | |
| 6,245,303 B1 * | 6/2001 | Bentley et al. | 422/629 |
| 6,340,003 B1 * | 1/2002 | Schoubye et al. | 123/3 |
| 6,668,763 B2 * | 12/2003 | Anderson et al. | 123/3 |
| 7,037,349 B2 * | 5/2006 | Dauer et al. | 48/214 A |
| 8,298,499 B2 * | 10/2012 | Wilhite et al. | 422/607 |
| 2004/0047800 A1 * | 3/2004 | Sennoun et al. | 423/652 |
| 2004/0137288 A1 * | 7/2004 | Morgenstern | 429/17 |
| 2011/0247573 A1 * | 10/2011 | McCann | 123/3 |

FOREIGN PATENT DOCUMENTS

| | | |
|---|---|---|
| EP | 1 106 803 A2 | 6/2001 |
| JP | H11-117729 A | 4/1999 |
| JP | 2000-291917 A | 10/2000 |
| JP | 2001-43882 A | 2/2001 |
| JP | 2001-200764 A | 7/2001 |
| JP | 2004-197569 A | 7/2004 |
| JP | 2005-42051 A | 2/2005 |
| JP | 2006-52688 A | 2/2006 |
| RU | 2031238 C1 | 3/1995 |
| WO | WO 2007/147008 A2 | 12/2007 |

* cited by examiner

METHOD AND SYSTEM FOR OPERATING A COMPRESSION IGNITION ENGINE ON ALCOHOL CONTAINING FUELS

The present invention is directed to a method of operating compression ignition engines and in particular to the operation of those engines with ether containing fuel being prepared on board.

The invention provides furthermore a system being useful for carrying out the method of the invention.

The most typical example of a compression ignition engine is the Diesel engine operating with high cetane numbered Diesel fuel. To reduce environmental pollution arising from combustion of Diesel fuel, several attempts have been made in the past to replace Diesel fuel with alternative fuels having reduced impact on the environment.

Ethers, in particular ethers prepared by dehydration of lower alcohols, such as dimethyl and diethyl ether, have shown to be a superior Diesel fuel in term of impact on the environment.

Use of lower ethers as Diesel fuel has been described in number of publications, e.g. U.S. Pat. Nos. 4,892,561, 5,906,664 and 7,449,034.

Despite of its clean combustion characteristics and high efficiency in a Diesel engine, the main disadvantage of ether based fuels is difficult storage and handling on board of vehicles. At ambient conditions, dimethyl ether is in the gaseous form. To transform the dimethyl ether fuel to its more convenient liquid form, the fuel has to be stored and handled under pressure.

It is known from the literature that ethanol is a poor fuel when applied to compression ignition engines. However, it was reported that ethanol/diethyl ether (DEE) mixtures overcome this limitation and open avenues for efficient and very clean diesel engine operation. However, there are practical issues to be handled. DEE is not at present available in any distribution network and has relatively stringent safety limitations including the use of a pressurized fuel tank. Together it advocates for the use of ethanol or ethanol containing fuels with conversion on-board of a vehicle.

Traditionally, the production of DEE is performed a moderate pressures (20 bars) by dehydration of ethanol over a suitable catalyst. Including such system on-board implies, evaporating the ethanol containing fuel, performing the conversion, condensating the products and further compression of the mixture (up to 600-2000 bar) before injection into the engine. The unsteady operation also adds in complexity for the present equipment and leads to additional costs in manufacturing and extra weight for the vehicle.

Modern Diesel engines are provided with a common rail fuel system. The system consists conventionally of a high pressure pump and a fuel accumulation chamber storing fuel at high pressure of about 80 bars and frequently higher. The accumulation chamber supplies multiple fuel injectors with high pressure fuel. Surplus fuel is withdrawn from the chamber, depressurised and recycled to the fuel tank.

The present invention focuses on a compact catalytically active common rail system that enables the on board production, storage and injection of the alcohol/ether/water containing fuel mixture. It is also flexible and can be used with other fuels e.g. non-alcohol containing diesel fuels, where catalytic pre-conversion is not suitable.

Thus, the general feature of the invention is to integrate an alcohol dehydration catalyst into the accumulation chamber of an engine common rail and operate at high pressure.

In its broadest embodiment, the invention is a method of operating a compression ignition engine on ether containing fuel obtained by on board conversion of an alcohol containing primary fuel, comprising the continuous steps of:

(a) withdrawing the alcohol containing primary fuel from a fuel tank and pressurising the primary fuel in its liquid form to a final engine injection pressure;

(b) introducing the pressurized primary fuel into a fuel accumulation chamber;

(c) distributing the pressurized primary fuel into pipes connecting the accumulation chamber with fuel injectors of the engine;

(d) prior to the fuel injectors converting at least a part of the pressurised primary fuel to an ether containing fuel by contact with an alcohol dehydration catalyst being arranged within the accumulation chamber;

(e) injecting the ether containing fuel into the engine;

(f) optionally recycling a part of the alcohol containing primary fuel from the accumulation chamber to the fuel tank.

The invention provides furthermore a system for use in operating a compression ignition engine on ether containing fuel, comprising a compression ignition engine;
a fuel tank adapted to store a primary alcohol containing fuel;
a high pressure pump to pressurize the primary fuel;
a fuel accumulation chamber adapted to receive the pressurized primary fuel;
connection pipes for connecting the accumulation chamber to fuel injectors for fuel injection into the engine; and an alcohol dehydration catalyst arranged inside the fuel accumulation chamber.

The system according to the invention may further comprise a fuel recirculation pipe connected to an outlet end of the accumulation chamber and to an inlet end of the fuel tank and a pressure control valve between the outlet end of the accumulation chamber and the inlet end of the fuel tank.

The alcohol dehydration catalyst is preferably arranged in fixed bed manner in a reactor mounted within the fuel accumulation chamber, so that the pressurized primary fuel is passed from inlet of the accumulation chamber through the catalyst bed and after conversion, the ether containing fuel is injected into the engine.

Preferably, the reactor is a radial flow reactor, wherein the alcohol containing primary fuel is passed in radial direction from centre of the reactor through the catalyst bed and towards a circular space between the reactor and inner wall of the accumulation chamber.

In such an embodiment the alcohol dehydration catalyst may be supported on a catalytically inert porous layer facing the centre of the reactor.

The porous layer is preferably selected from ceramic and metallic material, typically ceramic or metallic foam.

The main advantage of the method and system according to the invention is that all of the formed ether fuel is instantly used for combustion in the engine and storage of surplus ether containing fuel is avoided.

By means of the invention, the conversion of the primary fuel is performed in the liquid phase so there is no need of evaporation of the primary fuel and condensation of the ether containing fuel.

The accumulation chamber of the common rail ensures a buffer of converted fuel mixture that allows high-speed and quasi constant mass flow injections.

Formation of the ether containing fuel is accomplished by catalytic dehydration of the alcohol to its corresponding ether according to the reaction:

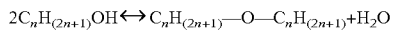

$$2C_nH_{(2n+1)}OH \leftrightarrow C_nH_{(2n+1)}-O-C_nH_{(2n+1)}+H_2O$$

The dehydration of alcohols to ethers generally is catalyzed by liquid or solid acids, such as sulphuric acid, alumina, silica alumina, a zeolite, sulphonic acid, zirconia-tungstates and alumina phosphates.

Alcohol dehydration is an equilibrium reaction. Thus, equilibrium limitations prevent 100% conversion of the alcohol to ether and water.

At a reaction temperature for e.g. a primary ethanol fuel consisting of 95 w % ethanol and 5 w % water, the equilibrium compositions in liquid phase at dehydration temperature between 150 and 350° C. are typically 9-21 w % ethanol, 19-22 w % $H_2O$ and 59-71 w % diethyl ether.

Ether fuels for use in compression ignition engines with useful ignition and combustion characteristics are for example a diethyl ether/ethanol/water mixture and a dimethyl ether/methanol/water mixtures with a methanol content of up to 20% and water content of up to 20%.

In U.S. Pat. No. 7,449,034 a Diesel fuel containing dimethyl ether, methanol and up to 48% water have been shown to be efficient fuels in compression ignition engines.

Beside of methanol and ethanol also mixtures of higher alcohols are suitable primary fuels for use in the invention.

Preferred alcohol mixtures are a mixture of methanol and ethanol.

Other suitable alcohol containing primary fuels are mixtures of hydrocarbons with one or more alcohols, such as biodiesel and alcohols, like Pongamia oil and ethanol (60-40 vol %), which will be catalytically converted to a mixture of bio-diesel/DEE/water containing ~15-20 vol % of DEE.

Further suitable primary fuels for use in the invention are mixtures of gasoline and alcohol, e.g. gasoline containing 85% ethanol being available at gas stations in Sweden.

Within the above ranges of the ether Diesel fuel compositions, the operating conditions of the inventive method will typically be adjusted to an injection temperature of between 120° C. and 350° C. and an injection pressure of between 80 and 2400 bars. Thereby, conversion of alcohol to a mixture of ether, water and alcohol proceeds in adiabatic manner in the liquid phase at appropriate reaction rate in presence of the dehydration catalyst.

In order to rise the temperature of the alcohol containing primary fuel to the dehydration reaction temperature, the fuel is preferably heated from ambient temperature. This is preferably performed by passing the pressurized fuel through a heat exchanger in indirect heat exchange with hot exhaust gas from the engine, prior to it is introduced into the catalyst within the accumulation chamber.

During start up of the engine, the exhaust gas may be at a temperature, which is insufficient to supply the necessary temperature to heat the alcohol containing primary fuel. At those conditions, it is preferred to include a further step in the above operation method of additionally heating the pressurized fuel e.g. by means of an electrical heater mounted in the accumulation chamber or an engine heater.

The dehydration catalyst is typically arranged as fixed bed inside the accumulation chamber.

The catalyst can fill the whole accumulation chamber or be arranged to allow reverse liquid flows for controlling the residence time in the bed, hence the conversion, as shown in FIG. 1 of the drawings. The volume of the common-rail allows storage of the product before injection.

Figure 2:
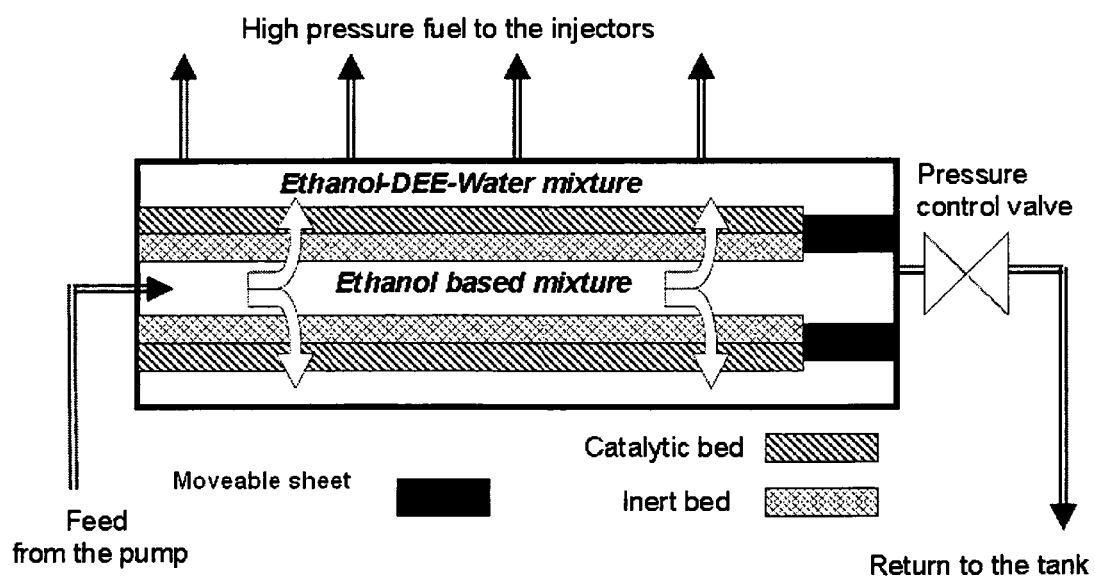

As mentioned above, the catalyst is preferably arranged in a radial flow reactor centrally arranged within the accumulation chamber as shown in FIG. 2 of the drawings.

When employing a radial flow reactor, the primary fuel is introduced into the accumulation chamber at inlet of the reactor. During operation of the reactor the outlet of the accumulation chamber is restricted or closed and the flow of the primary fuel is forced primarily in a radial direction from the centre of the reactor through the catalyst towards inner wall of the accumulation chamber.

Typically, a concentric space is arranged between the catalyst bed and the inner accumulation chamber wall for improved distribution to fuel injectors and storage of the ether containing fuel being formed when passing through the catalyst bed.

The radial flow in the catalyst ensures low pressure drop and long residence time.

When the catalyst is supported on a layer or bed of inert porous material, the primary fuel is prevented to come into contact with catalyst. This is advantageous, when conversion of the primary fuel is not desired or only a part of the primary fuel must be converted. The non-converted fraction of the primary fuel is recirculated to the fuel tank.

A preferred inert material has electric conductivity and may at the same time function as electric heater for heating the primary fuel prior to passage through the catalyst during e.g. start of the engine, when connected to a power source.

The amount of the alcohol containing primary fuel being passed through the catalyst is in the embodiment with a radial flow reactor controlled by the pressure control valve in the outlet line connecting the accumulation chamber with the fuel tank or the high pressure pump.

In order to allow the system to be used when no alcohol containing fuel is available and the engine must be run on e.g. conventional diesel fuel, the radial reactor is provided with a moveable impermeable sheet surrounding at least outlet of the reactor and connecting the reactor outlet with the outlet of the accumulation chamber. In closed position of the control valve primary fuel e.g. diesel can be passed through the reactor along the catalytic inert material and in axial direction through the reactor, when the impermeable moveable sheet is brought into a position allowing the fuel flowing from the reactor outlet into the space between the reactor outer wall and the accumulation inner wall.

Figure 3:
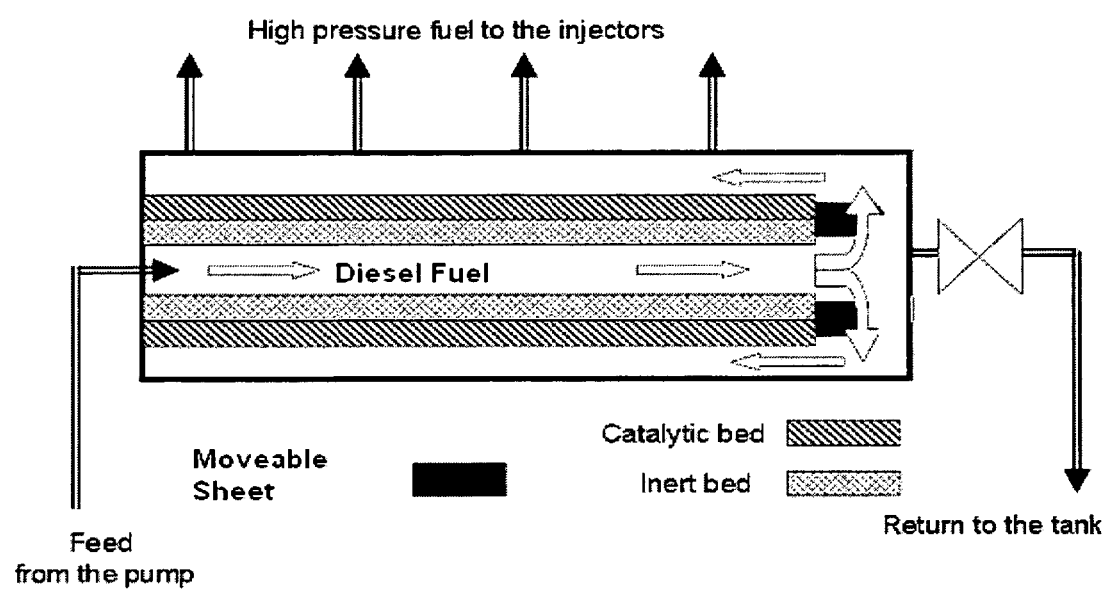

The above features and aspects of the invention are explained in more detail in the following description by reference to the drawings in which FIG. 1 schematically shows a cross section of a system with a common rail fuel injection unit provided with a alcohol dehydration catalyst arranged in axial flow catalyst bed according to one embodiment of the invention;

FIG. 2 is a schematically cross sectional view of a system with a radial flow catalyst bed within the accumulation chamber of a common rail according to a further embodiment of the invention; and FIG. 3 shows the system of FIG. 2, when operated on with conventional diesel fuel.

Referring to FIG. 1, a compression ignition engine with a common rail fuel injection system for use in a specific embodiment of the invention comprises an ethanol primary fuel tank (not shown) connected to a high pressure pump (not shown). Ethanol containing fuel is pressurized by the pump to a final injection pressure and passed to the accumulation chamber of the common rail system. The accumulation chamber is provided with a catalytic bed within a reactor being centrally arranged within the accumulation chamber and spaced apart from inner wall of the chamber.

During normal engine load cycles, the pressurized alcohol containing primary fuel optionally preheated is passed continuously to the accumulation chamber and distributed into the reactor holding a bed of alcohol dehydration catalyst and being concentrically arranged within the accumulation chamber.

By contact with the dehydration catalyst the alcohol containing primary fuel is converted to the above mentioned ether, alcohol and water fuel mixtures.

The thus formed ether containing fuel is introduced from the space between the inner wall of the accumulation chamber and the reactor to the fuel injectors of the engine.

FIG. 2 shows an embodiment of the invention with a radial flow reactor provided within the accumulation chamber.

The reactor is arranged concentric within the wall of the accumulation chamber.

Alcohol containing primary fuel is pressurized by a high pressure pump (not shown) and fed into the central part of the reactor. At outlet portion of the reactor, the reactor shell is provided with an impermeable moveable sheet providing a passage for unconverted primary fuel to outlet of the accumulation chamber and to a recirculation pipe for recirculation of the unconverted primary fuel to the fuel tank (not shown) or to the high pressure pump. The recirculation pipe is provided with a pressure control valve.

As shown in the Figure e.g. an ethanol containing primary fuel mixture being introduced into reactor is forced in radial direction through the reactor and passes initially through an inert layer or bed surrounding the central part of the reactor. Having passed through the inert layer or bed the primary fuel passes radially through a catalytic bed or layer supported on the inert layer to a circular space between the reactor and inner wall of the accumulation chamber. By passage to the catalytic bed with an alcohol dehydration catalyst, the primary fuel is converted to ether containing fuel, e.g. a mixture of ethanol, DEE and water. The ether containing fuel is subsequently passed from the circular space to fuel injectors of the engine (not shown).

The amount of primary fuel being converted is in this embodiment controlled by adjustment of the control valve and the catalyst bed volume. At closed valve position the complete amount of primary fuel is converted by the radial passage through catalyst. At open valve position the complete amount of primary fuel passes through the reactor in axial flow direction to the outlet of the accumulation chamber and is recycled to fuel tank or high pressure pump.

The inert layer serves to prevent contact and conversion of the portion of primary fuel flowing through the central part of the reactor to the outlet of the accumulation chamber.

The outlet portion of the radial flow reactor is in the shown embodiment of the invention provided with an impermeable cylindrical sheet connecting the reactor outlet with the outlet of the accumulation chamber.

In case of e.g. conventional non-alcohol containing Diesel fuel is introduced into the above system which must not be converted and is directly used as fuel in the engine, the impermeable circular sheet is retracted from the outlet of accumulation chamber and allows then passage of fuel from the reactor outlet to the fuel injectors via the circular space in the accumulation chamber as shown in FIG. 3.

The above description and the Figures are purely schematically and not at scale, parts and means being otherwise conventional in a common rail injection system that will be obvious to those skilled in the art and are not shown in the Figure.

The invention claimed is:

1. Method of operating a compression ignition engine on ether containing fuel obtained by on board conversion of an alcohol containing primary fuel, comprising the continuous steps of:
   (a) withdrawing the alcohol containing primary fuel from a fuel tank and pressurizing the primary fuel in its liquid form to a final engine injection pressure;
   (b) introducing the pressurized primary fuel into a fuel accumulation chamber;
   (c) distributing the pressurized primary fuel into pipes connecting the accumulation chamber to fuel injectors of the engine;
   (d) prior to the fuel injectors, converting a part of the pressurized primary fuel to an ether containing fuel by contact with an alcohol dehydration catalyst being arranged within the accumulation chamber;
   (e) injecting the ether containing fuel into the engine; and
   (f) recycling a remaining part of the pressurized primary fuel from the accumulation chamber to the fuel tank,
   wherein the pressurized primary fuel is passed through a radial flow reactor and the alcohol dehydration catalyst in radial direction from center of the reactor toward a circular space between the reactor and inner wall of the accumulation chamber.

2. The method of claim 1, wherein the dehydration catalyst is arranged as fixed bed within the fuel accumulation chamber and the pressurized primary fuel is passed from inlet of the accumulation chamber through the catalyst bed and after conversion to the ether containing fuel is injected into the engine.

3. The method of claim 1, wherein a layer of inert material is arranged within the radial flow reactor facing the center of the reactor, and wherein the layer of inert material consists of a porous material, selected from ceramic and metallic material.

4. The method according to claim 1 including the further step of preheating the alcohol containing primary fuel by indirect heat exchange with hot exhaust gas from the engine.

5. The method according to claim 1 including the further step of heating the pressurized fuel within the accumulation chamber.

6. The method according to claim 1, wherein the alcohol containing primary fuel contains a mixture of different alcohols.

7. The method according to claim 1, wherein the alcohol containing primary fuel contains methanol and/or ethanol.

8. The method according to claim 1, wherein the alcohol containing primary fuel contains a mixture of hydrocarbons and one or more alcohols.

9. A system for use in operating a compression ignition engine on ether containing fuel, comprising
   a compression ignition engine;
   a fuel tank adapted to store a primary alcohol containing fuel;
   a high pressure pump to pressurize the primary fuel;
   a fuel accumulation chamber adapted to receive the pressurized primary fuel;
   connection pipes for connecting the accumulation chamber to fuel injectors for fuel injection into the compression engine;
   an alcohol dehydration catalyst arranged inside the fuel accumulation chamber; and
   a fuel recirculation pipe connected to an outlet end of the accumulation chamber and to an inlet end of the fuel tank and a pressure control valve between the outlet end of the accumulation chamber and the inlet end of the fuel tank,
   wherein the alcohol dehydration catalyst is arranged as fixed bed in a radial flow reactor.

10. The system according to claim 9, wherein a layer of inert material is arranged within the radial flow reactor facing the center of the reactor and the catalyst is supported on the layer.

11. The system according to claim 9, wherein an impermeable moveable sheet surrounds outlet of the reactor and connects the outlet of the reactor and the outlet of the accumulation chamber.

\* \* \* \* \*